(12) United States Patent
Tahernezhaadi

(10) Patent No.: US 6,438,225 B1
(45) Date of Patent: Aug. 20, 2002

(54) METHOD AND SYSTEM FOR DETECTING AND CONTROLLING SEVERE ECHO

(75) Inventor: Mansour Tahernezhaadi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/482,998

(22) Filed: Jan. 13, 2000

(51) Int. Cl.[7] .............................................. H04M 9/08
(52) U.S. Cl. ........................ 379/406.01; 379/406.05; 379/406.08; 379/406.12; 379/406.14; 379/406.09; 379/406.06
(58) Field of Search .................. 379/400–410, 379/406.01–406.16; 381/94.1–94.5

(56) References Cited

U.S. PATENT DOCUMENTS

| | | | | | |
|---|---|---|---|---|---|
| 4,757,527 A | * | 7/1988 | Beniston et al. | ............. | 379/410 |
| 5,146,470 A | * | 9/1992 | Fujii et al. | .................. | 375/103 |
| 5,825,898 A | * | 10/1998 | Marash | ......................... | 381/92 |
| 5,907,624 A | * | 5/1999 | Takada | ....................... | 381/94.2 |
| 5,933,495 A | * | 8/1999 | Oh | .............................. | 379/406 |
| 5,937,060 A | * | 8/1999 | Oh | .............................. | 379/406 |
| 6,097,820 A | * | 8/2000 | Turner | ....................... | 381/94.3 |
| 6,167,133 A | * | 12/2000 | Caceres et al. | ............. | 379/410 |

\* cited by examiner

*Primary Examiner*—Forester W. Isen
*Assistant Examiner*—Ramnandan Singh
(74) *Attorney, Agent, or Firm*—Steven A. May

(57) ABSTRACT

A system and method for detecting and controlling severe echo. The system includes an echo canceller having an adaptive filter responsive to a set of coefficients, a first memory storing a software program operative to evaluate these coefficients to determine the severity of echo existing in the system, and a second memory accessible by the echo canceller and the first memory which stores the coefficients. Upon evaluating the coefficients, the system and method enables the proper mode of echo cancellation in the echo canceller.

32 Claims, 2 Drawing Sheets

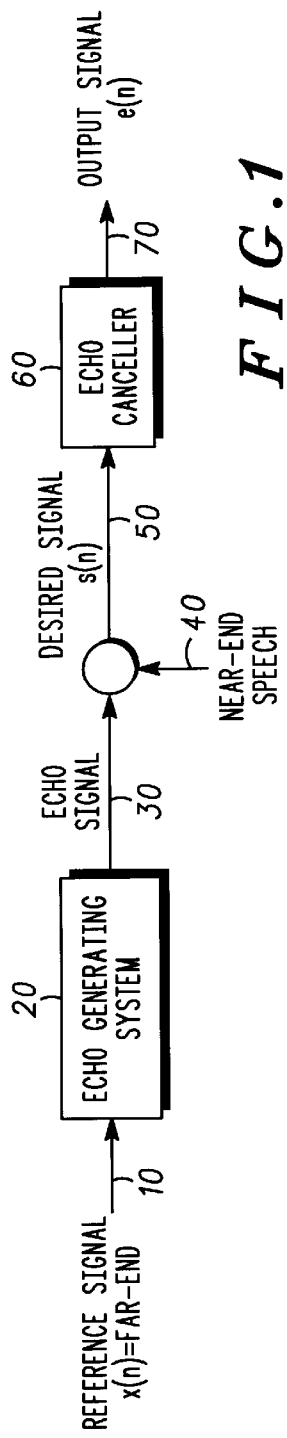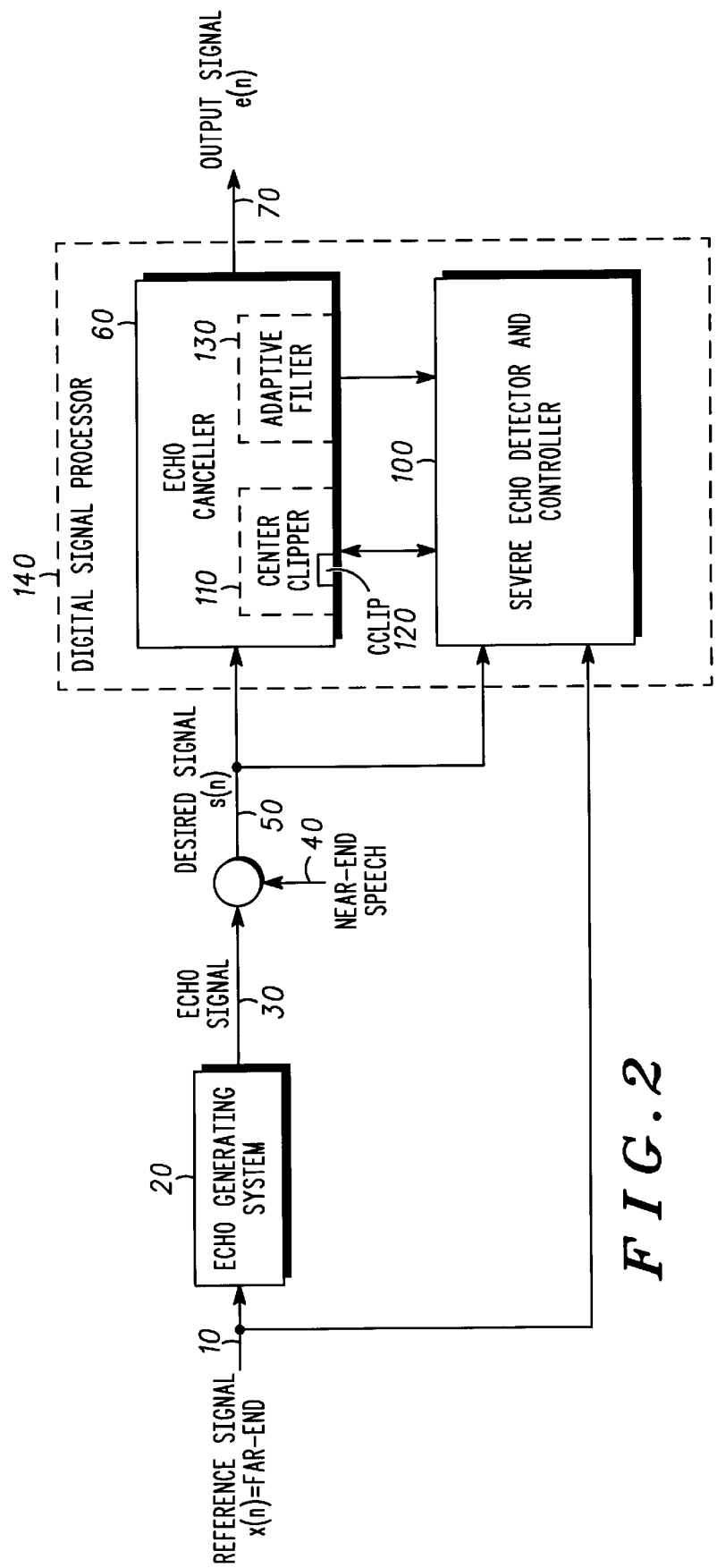

METHOD AND SYSTEM FOR DETECTING AND CONTROLLING SEVERE ECHO

BACKGROUND OF THE INVENTION

The present invention relates to echo cancellation in telecommunications. In particular, this invention addresses the problems of severe acoustic echo in cellular telephone technology.

An echo cancellation device is a necessary component in modem telecommunications. In situations of imperfect impedance matching, a signal broadcast over a telecommunications network may reflect back to the generator of the signal. Since the reflected signal must travel from the location of impedance mismatching and back to the generator, the generator of the signal receives the reflected signal with a delay. This return of a reflected signal with a delay is commonly known as echo. Without echo cancellation, a telephone user would not be able to effectively communicate because the reflected signal would return the speaker's voice to him or her after each uttered sound.

In addition to echo created by impedance mismatches in the telecommunications network, the acoustics of using the phone may create echo. Acoustic echo is most commonly created by the use of a hands-free phone. In instances where the echo signal level is close to or greater than the generated signal, severe acoustic echo has been observed. In general, for echo cancellers to perform satisfactorily, the power of the echo generating signal must be greater than the echo signal by a predetermined set threshold. This threshold is commonly set at 6 dB. Thus, in situations when the echo signal power is closer to the echo generating signal power by less than the predetermined set threshold, the echo is referred to as severe echo.

In cellular telephone technology, echo cancellation devices have the ability to cut or clip the signal heard by the generator to eliminate residual echo from the echo canceller. This is typically known as a center clipping function. While prior art echo cancellers have a center clipping function, the presence of high output residual echo power prevents the echo canceller from sufficiently combating severe echo, especially severe acoustic echo.

BRIEF SUMMARY OF THE INVENTION

Thus there is a particular need for a method and apparatus that detects severe echo and directs the echo canceller to utilize a center clipping function. Briefly, in accordance with an embodiment of the present invention, a system and method is provided that detects severe echo by converting an echo canceller's adaptive filter coefficients into the frequency domain. Maximum frequency bin power is determined based on the converted coefficients and compared to a predetermined threshold. Sustained presence of maximum frequency bin power exceeding the threshold is indicative of severe echo.

BRIEF DESCRIPTION OF THE DRAWINGS

FIG. 1 is a block diagram of the prior art.

FIG. 2 is a block diagram of the present embodiment

DETAILED DESCRIPTION OF THE PRESENTLY PREFERRED EMBODIMENTS

Figure 3:
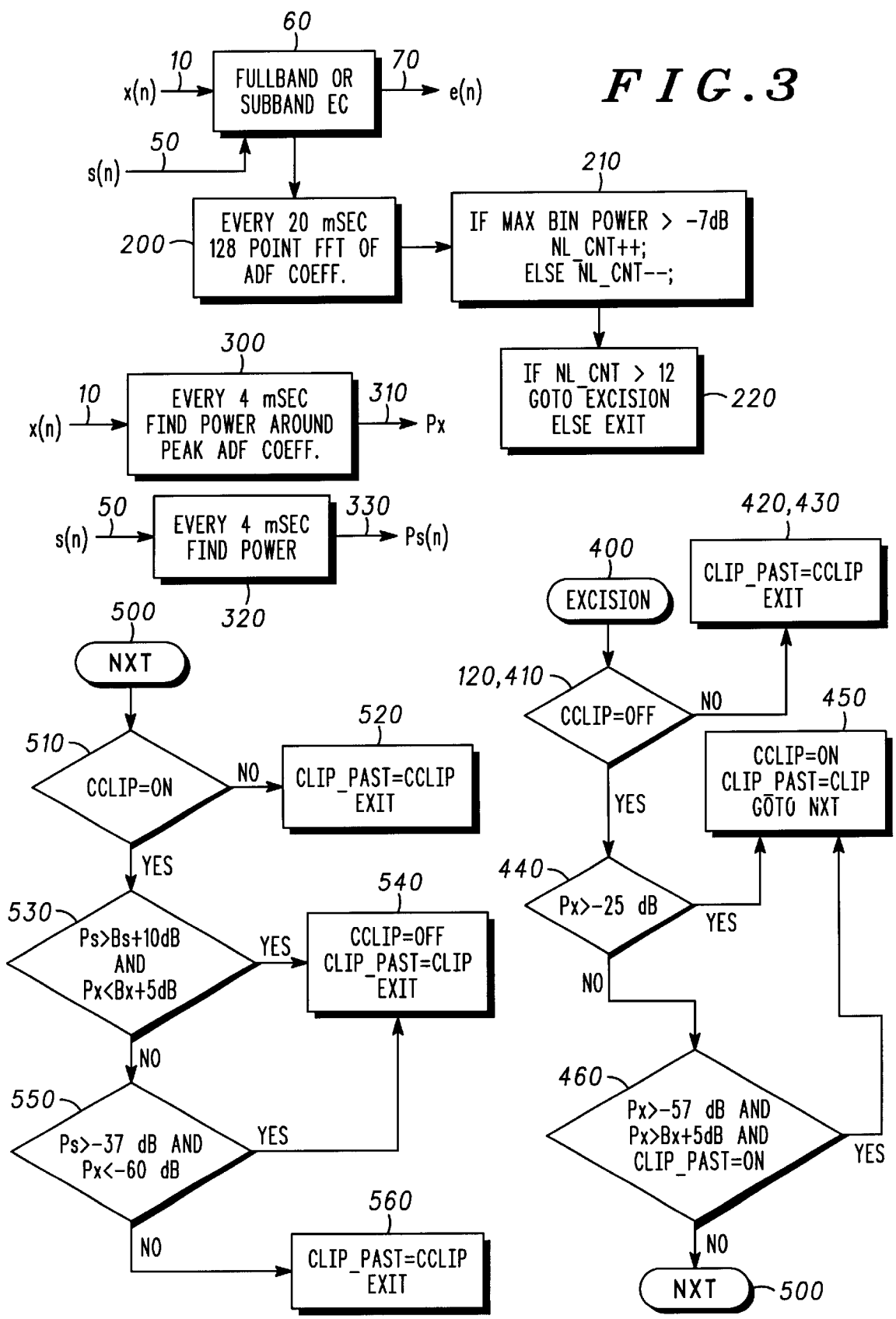
FIG. 3 is a flowchart of the present embodiment.

The present embodiment complements an existing echo canceller by detecting severe echo and directing the echo canceller to utilize its center clipping function. This is done by evaluating the coefficients from the existing echo canceller's adaptive filter.

Typical echo cancellers are implemented using a time, frequency, or sub-band analysis of the input signals that yields coefficients for an adaptive filter. This adaptive filter analyzes a desired signal in an effort to produce an echo-free output signal. As one skilled in the art will recognize, the most common method of generating coefficients for the adaptive filter is a least mean squares (LMS) approach.

The present embodiment utilizes the coefficients that drive the adaptive filter to analyze whether the echo canceller is properly functioning. Additionally, the present embodiment evaluates the power of signals and background noise. By analyzing the coefficients of the echo canceller, power measurements, and background noise assessments, the severe echo detector and controller detects severe echo and imposes the center clipping function on the echo canceller.

The present embodiment, however, is not restricted to severe echo cancellation and detection. Analysis of the adaptive filter coefficients of the echo canceller can be useful for detecting and controlling other echo environments where echo is present. Moreover, the present embodiment improves upon the prior art by evaluating the performance of the echo canceller through frequency domain analysis of the adaptive filter coefficients.

The present embodiment is directed to echo cancellation in cellular telephone technology. In particular, the preferred embodiment is implemented in the telecommunications infrastructure. Specifically, the preferred embodiment is embedded at the transcoder level of the infrastructure. In the alternative, the present embodiment may be implemented directly in a cellular phone or at a different location in the infrastructure.

FIG. 1 shows a typical prior art echo cancellation system. A reference signal 10, is inputted into an echo generating system 20. As an output from the echo generating system, an echo signal 30 is created. The reference signal 10, also referred as the far-end speech x(n), is one of two speech signals in the echo cancellation signal. The other speech signal is the near-end speech signal 40. The aggregate of the near-end speech signal 40 and the echo signal 30 creates a desired signal 50. The desired signal 50 is notated as s(n). The echo canceller 60 functions to transmit the desired signal 50 as echo-free as possible. The echo canceller 60 yields an output signal 70, notated as e(n).

FIG. 2 is a block diagram of the present embodiment. An echo canceller 60 is coupled with a severe echo detector and controller (SEDC) 100. Incorporated in the echo canceller 60 is a center clipper function 110 and an adaptive filter 130. The severe echo detector and controller 100 communicates with the echo canceller 60 in order to enable or disable the center clipper function 110. In the preferred embodiment, a status flag 120, referred to as "cclip," is the mode of communication between the echo canceller 60 and the SEDC 100. The SEDC 100 evaluates whether severe echo is present by examining a set of coefficients from the adaptive filter 130. In the preferred embodiment, both the echo canceller 60 and the severe echo controller and detector are stored in memory as software modules run by a digital signal processor 140. The preferred embodiment is implemented with a Motorola, Inc. 56301 digital signal processor running assembly language code. However, the present invention can also be implemented using other digital signal processors such as another processor in the Motorola 563x series or a processor from the Texas Instruments, Inc. TMS320C5x series. A general processor or hard-wired circuit can also be used without departing from the essential spirit and scope of the invention.

FIG. 3 is a flowchart of the method of the present embodiment. The present embodiment is based on an echo canceller 60 that utilizes a time domain mode of echo cancellation. In the alternative, those skilled in the art will appreciate that frequency or subband domain approaches may be used. In step 200, every 20 milliseconds, a fast Fourier transform (FFT) is performed on a set of coefficients from the adaptive filter 130. In the preferred embodiment, this set of coefficients comprise data values stored in a memory accessible by the digital signal processor 140. The preferred embodiment utilizes a set of 128 coefficients and performs a 128-point FFT with a peak echo canceller adaptive filter coefficient at the center. Step 200 converts the time domain coefficients into a frequency domain set of values. Those skilled in the art will appreciate that if the echo canceller 60 utilizes a frequency domain mode of analysis, step 200 is not necessary.

After the coefficients are converted into the frequency domain, step 210 proceeds to identify the maximum power value, known as the "max bin power." The max bin power is identified by squaring the results of step 200 and isolating the largest value. After the max bin power has been identified, step 210 compares the max bin power with a threshold power value every 20 milliseconds. In the preferred embodiment, this threshold is −7 decibels (dB). A value of −7 dB is typically indicative of a strong echo presence.

Step 210 concludes with a modification of a counter. If the max bin power is greater than the threshold power value, the counter is incremented. If, however, the max bin power is less than the threshold power value, the counter is decremented, provided the counter is greater than zero.

Step 220 examines the counter every 20 milliseconds. The value of the counter determines whether conditions for severe echo are present. In the preferred embodiment, the counter threshold is set at 12. If the counter value is greater than a counter threshold, the system concludes that severe echo is present and continues on to step 400, the first step in the excision subroutine. Otherwise, the method returns to the main echo cancellation routine.

The excision subroutine, which preferably runs every 4 milliseconds, controls the echo canceller. In order to reach this stage, the system first finds that severe echo exists. In the preferred embodiment, the echo canceller 60 is controlled by a status flag 120. If the system indicates that severe echo is not properly addressed by the echo canceller 60, it changes the status flag 120.

In the preferred embodiment, several inputs are used to control the echo canceller 60. These inputs are the status flag 120, a reference signal power (Px) 310, a desired signal power (Ps) 330, a reference signal background noise floor (Bx), and a desired signal background noise floor (Bs): While there are numerous methods for determining each of these inputs, the preferred embodiment uses a specific method for determining the reference signal power 310.

The reference signal power 310 is determined at step 300. In step 300, the reference signal 10 is inputted and the reference power signal 310 is computed every 4 milliseconds. The peak echo location assessed by step 210 is used to center the power measurement. Every four milliseconds, four average reference powers corresponding to four 4 millisecond reference segments are computed. These four 4 millisecond segments correspond to two segments in length before the peak echo location and two segments after the peak echo location, wherein each of the segments is four milliseconds in length.

The desired signal power 330 is determined at step 320. This entails finding the average power every 4 milliseconds. Various methods of determining the signal power can be used. For example, the preferred embodiment uses a rectangular averaging scheme, where all the samples contained in the segment are squared, summed, and then divided by the number of samples in the segment as to obtain the averaged value.

With the reference signal power 310 and the desired signal power 330 computed, the system proceeds to the excision subroutine 400. The excision subroutine 400 indicates that step 220 concluded that severe echo exists.

Step 410 begins the controlling of the echo canceller 60 by evaluating whether the status flag 120 is OFF. In the preferred embodiment, the OFF setting of the status flag 120 indicates that the echo canceller 60 has not detected conditions for severe echo. In an alternative embodiment, the ON setting could be utilized to indicate that severe echo has not been detected. If the test in step 410 is false, the status flag 120 is ON and the echo canceller 60 has already handled the echo appropriately. The system then proceeds to step 420.

In step 420, the method sets a past status flag register 430 to the current status flag 120 value and returns to the main echo cancellation routine. Step 420 indicates that the system does not need to modify the echo canceller.

If the test in step 410 is true, the status flag 120 indicates that the echo canceller 60 has not detected severe echo. In this case, the system proceeds to step 440. In step 440, the reference signal power 310 is compared with a reference signal power threshold. In the preferred embodiment, the reference signal power threshold is −25 dB. If the reference signal power 310 is greater than the reference signal power threshold, the system proceeds to step 450 where the status flag 120 is also set to ON, thereby enabling the center clipper 110. The past status flag register 430 is set to ON. From step 450, the system proceeds to the nxt subroutine 500. If the reference signal power 310 does not exceed the reference signal power threshold, the system proceeds to step 460.

In step 460, the system examines whether the echo canceller addressed severe echo in the previous cycle. If it did not address severe echo, the past status flag register 430 should be OFF and the system proceeds to the nxt subroutine 500. If, however, the system addressed severe echo in the previous cycle, the past status flag register 430 will be set to ON. If the past status flag register 430 is ON, the system analyzes whether the echo canceller prematurely turned off the center clipper 110. This is done by examining whether the reference signal power 310 exceeds a secondary reference signal power threshold, and if the reference signal power 310 is sufficiently above the reference signal noise floor. In the preferred embodiment, the secondary reference signal power is set at −57 dB and the reference signal power must exceed the reference signal background noise by 5 dB to maintain severe echo cancellation.

If the reference signal power 310 exceeds the secondary reference signal power threshold, and is sufficiently above the reference signal noise floor while the past status flag register 430 is ON, the system moves to step 450, thereby enabling the center clipper 110. If the reference signal power 310 does not exceed the secondary reference signal power threshold, is not sufficiently above the reference signal noise floor, or the past status flag register 430 is not ON, then the system moves to the nxt subroutine 500 without changing the status flag 120 or the past status flag register 430.

The nxt subroutine, running every 4 milliseconds, 500 serves to ensure that severe echo detection is, in fact, present in the system. In step 510, the system tests if the status flag 120 is set to ON. If it is not, the system proceeds to step 520 where the past status flag 430 is set to equal the status flag 120 setting of OFF, and the cycle returns to the main echo cancellation routine. In this scenario, the system has not verified the severe echo detection declaration in step 220 through step 440 nor found the echo canceller 60 to have prematurely turned off the center clipper 110 in step 460. Consequently, the system allows the echo canceller 60 to continue without engaging the center clipper 110. If, however, the status flag 120 is set to ON at step 510, the system has indicated that the echo canceller should be adjusted. The system then proceeds to step 530 to ensure that the signal identified is truly an echo. In step 530 the system examines whether the desired signal power is sufficiently above the desired signal power noise floor and whether the reference signal power is not sufficiently above the reference signal power noise floor. In the preferred embodiment, the desired signal power is at least 10 dB above the desired signal power noise floor and the reference signal power is less than 5 dB greater than the reference signal power noise floor. :If both conditions are met, the system has not found severe echo and the method proceeds to step 540. In step 540, both the status flag 120 and the past status flag 430 are set to OFF and the method returns to the main echo cancellation routine. If either or both conditions fail, the system proceeds to step 550.

Step 550 also ensures that the method properly identified severe echo by evaluating the reference signal power and desired signal power. If the desired signal power is above a desired signal power threshold and the reference signal power is below a third reference signal power threshold, the system goes to step 540. In the preferred embodiment, the desired signal power threshold is −37 dB and the third reference signal power threshold is −60 dB. If either condition is not met, the system proceeds to step 560. In step 560, the past status flag 430 is set to the current status flag 120 setting of ON and the method returns to the main echo cancellation routine. If either condition of 550 fails, the system has correctly found severe echo where the echo canceller alone did not.

The present invention provides the ability to detect and control severe echo. By controlling the center clipping function, the present embodiment enables the echo canceller to properly function where severe echo would otherwise remain prominent in the system. In addition, the present embodiment provides a method of analyzing the performance of the echo canceller by evaluating the coefficients of the echo canceller's adaptive filter. The present embodiment further provides a method of utilizing frequency domain methods of performing the coefficients analysis.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A system for supplementing echo detection and cancellation comprising:
    an echo canceller comprising an adaptive filter having a plurality of time domain adaptive filter coefficients, wherein the echo canceller converts the time domain adaptive filter coefficients to the frequency domain to produce a plurality of frequency domain adaptive filter coefficients;
    an echo detector that receives the plurality of frequency domain adaptive filter coefficients from the echo canceller, performs a spectral evaluation of the frequency domain adaptive filter coefficients, determines a severity of echo present based on the spectral evaluation, and, in response to a determination of severe echo, enables the echo canceller to suppress the severe echo;
    a first memory storing a computer program operative to evaluate the severity of echo present by analyzing said set of frequency domain adaptive filter coefficients; and
    a second memory storing said set of frequency domain adaptive filter coefficients accessible by said echo canceller and said first memory.

2. The system in claim 1 wherein said echo canceller is implemented in a third memory storing a computer program.

3. The system in claim 1 wherein said first memory is operative to evaluate the severity of echo present by performing a fast Fourier transform on said set of coefficients.

4. The system in claim 1 wherein said first memory is operative to evaluate a power measurement of a reference signal.

5. The system in claim 1 wherein said first memory is operative to evaluate a power measurement of a reference signal, compares said power measurement of said reference signal with a background noise measurement of said reference signal, and evaluates said second register.

6. The system in claim 1 wherein said first memory is operative to evaluate a power measurement of a reference signal with a background noise measurement of said reference signal and a power measurement of a desired signal with a background noise measurement of said desired signal.

7. The system in claim 1 further comprising a first register operative to enable a mode of echo cancellation by said echo canceller.

8. The system in claim 6 further comprising a second register wherein said first memory stores a previous value of said first register.

9. The system in claim 1 wherein said first memory is operative to evaluate a power measurement of a reference signal and a power measurement of a desired signal.

10. The system in claim 1 wherein said echo canceller, said first memory, and said second memory are implemented in a telecommunications infrastructure.

11. The system in claim 1 wherein said echo canceller, said first memory, and said second memory are implemented in a cellular telephone.

12. An echo cancellation system comprising:
    an echo canceller comprising an adaptive filter having a plurality of adaptive filter coefficients;
    means for analyzing said plurality of adaptive filter coefficients to determine if severe echo is present; and
    means for enabling a mode of echo cancellation in said echo canceller in response to a determination that severe echo is present.

13. A system for detecting and controlling severe echo comprising:
    an echo canceller comprising an adaptive filter having a plurality of adaptive filter coefficients;
    a desired signal inputted into said echo canceller;
    an output signal yielded from said echo canceller;
    a first register operative to enable a mode of echo cancellation by said echo canceller; and a memory storing a computer program operative to evaluate said plurality of adaptive filter coefficients and to adjust said first register based on said evaluation.

14. A method for detecting and controlling echo comprising the steps of:
monitoring a reference signal, a desired signal, and a set of adaptive filter coefficients utilized by an adaptive filter of an echo canceller;
analyzing said set of adaptive filter coefficients to evaluate the severity of echo present in said desired signal; and
communicating with said echo canceller to adjust echo cancellation functions based upon the analyzed adaptive filter coefficients.

15. The method of claim 14 wherein the step of analyzing said set of coefficients comprises the steps of performing a fast Fourier transform on the coefficients, squaring the result, and selecting the maximum resulting value.

16. The method of claim 15 further comprising the step of comparing said maximum resulting value with a threshold and utilizing the results to adjust a counter.

17. The method of claim 14 wherein the step of communicating with said echo canceller utilizes a status flag.

18. The method of claim 17 further comprising the step of storing at least one previous value of said status flag.

19. The method of claim 14 wherein the step of communicating with said echo canceller instructs said echo canceller when to begin to counteract said echo.

20. The method of claim 14 wherein the step of communicating with said echo canceller instructs said echo canceller when not to stop counteracting said severe echo.

21. The method of claim 14 wherein the step of communicating with said echo canceller instructs said echo canceller when to stop counteracting said severe echo.

22. The method of claim 14 wherein the step of communicating with said echo canceller further comprises the evaluation of a first power measurement from said first signal.

23. The method of claim 14 wherein the step of communicating with said echo canceller further comprises the step of comparing said first power measurement with a background noise measurement.

24. The method of claim 14 wherein the step of communicating with said echo canceller further comprises the step of comparing said first power measurement with a first background noise measurement and a second power measurement from said second signal with a second background noise measurement.

25. The method of claim 14 wherein the step of communicating with said echo canceller further comprises the step of evaluating said first power measurement and said second power measurement.

26. A method of detecting and controlling severe echo, comprising the steps of:
providing a desired signal and an output signal;
monitoring a set of adaptive filter coefficients utilized by an adaptive filter of an echo canceller;
converting said set of adaptive filter coefficients from time domain values into frequency domain values;
squaring the frequency domain values to yield adaptive filter coefficient power values;
isolating the largest adaptive filter coefficient power value;
adjusting a counter in response to the largest adaptive filter coefficient power value;
comparing said counter with a counter threshold value;
evaluating whether echo is present in said desired signal response by comparing said counter with said threshold value; and
directing said echo canceller to perform echo cancellation on said desired signal in yielding said output signal.

27. The method of claim 26 wherein the step of converting said set of coefficients from time domain values into frequency domain values is accomplished by using a fast Fourier transform.

28. The method of claim 26 further comprising the step of validating a determination of echo present in said desired signal.

29. The method of claim 26 wherein said step of validating a determination of echo present in said desired signal comprises evaluating a reference signal power.

30. The method of claim 26 wherein said step of validating a determination of echo present in said desired signal comprises evaluating a reference signal power and a reference signal background noise floor.

31. The method of claim 26 wherein said step of validating a determination of echo present in said desired signal comprises evaluating said desired signal power.

32. The method of claim 26 wherein said step of validating a determination of echo present in said desired signal comprises evaluating said desired signal power and a desired signal background noise floor.

* * * * *